US009221015B2

(12) United States Patent
Bull et al.

(10) Patent No.: US 9,221,015 B2
(45) Date of Patent: Dec. 29, 2015

(54) COPPER CONTAINING ZSM-34, OFF AND/OR ERI ZEOLITIC MATERIAL FOR SELECTIVE REDUCTION OF NOX

(75) Inventors: Ivor Bull, Hopewell Junction, NY (US); Ulrich Müller, Neustadt (DE)

(73) Assignee: BASF SE, Ludwigshafen (DE)

( * ) Notice: Subject to any disclaimer, the term of this patent is extended or adjusted under 35 U.S.C. 154(b) by 290 days.

(21) Appl. No.: 13/183,516

(22) Filed: Jul. 15, 2011

(65) Prior Publication Data

US 2012/0014865 A1    Jan. 19, 2012

Related U.S. Application Data

(60) Provisional application No. 61/364,411, filed on Jul. 15, 2010.

(51) Int. Cl.
| | |
|---|---|
| C10B 39/02 | (2006.01) |
| B01D 53/94 | (2006.01) |
| B01J 29/56 | (2006.01) |
| B01J 35/10 | (2006.01) |
| B01J 37/02 | (2006.01) |
| B01J 35/04 | (2006.01) |

(52) U.S. Cl.
CPC ............. *B01D 53/9418* (2013.01); *B01J 29/56* (2013.01); *B01J 35/1004* (2013.01); *B01J 37/0215* (2013.01); *B01D 2251/2062* (2013.01); *B01D 2251/2067* (2013.01); *B01D 2255/2022* (2013.01); *B01D 2255/2027* (2013.01); *B01D 2255/20761* (2013.01); *B01D 2255/504* (2013.01); *B01J 35/04* (2013.01); *B01J 2229/36* (2013.01); *Y02C 20/10* (2013.01)

(58) Field of Classification Search
None
See application file for complete search history.

(56) References Cited

U.S. PATENT DOCUMENTS

| | | | | |
|---|---|---|---|---|
| 3,649,177 | A | * | 3/1972 | Rosback .......................... 502/79 |
| 4,086,186 | A | * | 4/1978 | Rubin et al. ..................... 502/62 |
| 5,254,322 | A | | 10/1993 | Bhore et al. |
| 2004/0262197 | A1 | * | 12/2004 | McGregor et al. ........ 208/120.01 |
| 2007/0134146 | A1 | * | 6/2007 | Bull et al. .................. 423/239.2 |
| 2010/0310440 | A1 | | 12/2010 | Bull et al. |
| 2011/0020204 | A1 | | 1/2011 | Bull et al. |
| 2011/0142755 | A1 | | 6/2011 | Bull et al. |
| 2011/0165051 | A1 | | 7/2011 | Beutel et al. |
| 2011/0165052 | A1 | | 7/2011 | Beutel et al. |
| 2012/0014865 | A1 | | 1/2012 | Bull et al. |
| 2012/0014867 | A1 | | 1/2012 | Bull et al. |

FOREIGN PATENT DOCUMENTS

| | | |
|---|---|---|
| JP | 3267151 | 11/1991 |
| JP | 06-015183 | 1/1994 |
| WO | WO-2008/132452 | 11/2008 |
| WO | WO 2008132452 A2 * | 11/2008 |
| WO | WO-2011/045252 | 4/2011 |
| WO | WO-2011/064186 | 6/2011 |

OTHER PUBLICATIONS

Beck, Donald W., "Zeolite Molecular Sieves", *John Wiley & Sons*, 1974, 60 pgs.
Bennett, J. M., "Non-identity of the Zeolites Erionite and Offretite", *Nature* vol. 214, Issue 5092 Jun. 3, 1967, 1005-1006.
Briend, M. et al., "Influence of the Choice of the Template on the Short- and Long-Term Stability of SAPO-34 Zeolite", *J. Phys. Chem*, 99 1995, 8270-8276.
Centi, Gabriele et al., "Nature of active species in copper-based catalysts and their chemistry of transformation of nitrogen oxides", *Applied Catalysis A: General 132* 1995, 179-259.
Gard, J. A. et al., "The Crystal Structure of the Zeolite Offretite, K1.1Ca1.1Mg0.7[Si12.8Al5.2O36]. 15.2H2O", *Acta Crystallographica Section B Structural Crystallography and Crystal Chemistry* vol. 28, Part 3 Mar. 1972, 825-834.
Lillerud, Karl P. et al., "On the synthesis of erionite—offretite intergrowth zeolites", *Aeolites*, vol. 6 Nov. 1986, 474-483.
Mortier, W. J., "Compilation of Extra Framework Sites in Zeolites", *Structure Commission of the International Zeolite Association* 1982, 70 pgs.
Panias, D. et al., "Speciation Diagrams of Copper (II) Ions in Equeous Ammoniacal Solutions", *Mineral Wealth 116* 2000, 12 pgs.
Poshusta, Joseph C., "Characterization of SAPO-34 membranes by water adsorption", *Journal of Membrane Science 186* 2001, 25-40.
Szostak, R., "Handbook of Molecular Sieves", *Van Nostrand Reinhold*, NY 1992, 5 pgs.
PCT International Search Report & Written Opinion in PCT/IB2011/052979, 8 pgs.

* cited by examiner

*Primary Examiner* — Melvin C Mayes
*Assistant Examiner* — Stefanie Cohen
(74) *Attorney, Agent, or Firm* — Servilla Whitney LLC

(57) ABSTRACT

Described is a copper containing ZSM-34, OFF and/or ERI zeolitic material having a silica to alumina mole ratio ranging from about 4 to about 50 and a copper content, reported as CuO, ranging from about 1 to about 10 wt.-%, based on the total weight of the calcined zeolitic material, and having an alkali metal content, reported as metal oxide, ranging from about 1.5 to about 12 wt.-%.

20 Claims, No Drawings

COPPER CONTAINING ZSM-34, OFF AND/OR ERI ZEOLITIC MATERIAL FOR SELECTIVE REDUCTION OF NOX

CROSS REFERENCE TO RELATED APPLICATIONS

This application claims the benefit of U.S. Provisional Application Ser. No. 61/364,411, filed Jul. 15, 2010, which is hereby incorporated by reference.

DESCRIPTION

The present invention relates to a copper containing ZSM-34, OFF and/or ERI zeolitic material having a silica to alumina mole ratio ranging from about 4 to about 50 and a copper content, reported as CuO, ranging from about 1 to about 10 wt.-%, based on the total weight of the calcined zeolitic material, and having an alkali metal content, reported as the metal oxide, ranging from about 1.5 to about 12 wt.-%.

Both synthetic and natural zeolites and their use in promoting certain reactions, including the selective reduction of nitrogen oxides with ammonia in the presence of oxygen, are well known in the art. Zeolites are aluminosilicate crystalline materials having rather uniform pore sizes which, depending upon the type of zeolite and the type and amount of cations included in the zeolite lattice, range from about 3 to 10 Angstroms in diameter. ZSM-34 is an intergrowth structure of two closely related zeolites, Offretite (OFF) and Erionite (ERI), which belong to the "Chabazite group" of materials (Nature, 1967, 214, p1005- and ACTA Crystallographica, 1972, B28, p825-). The Erionite structure is built from connected 8, 6 and 4 membered rings which are all common to the Chabazite structure. However, these building units are uniquely connected to form an 8-membered ring cage system which has an adjoining system of Cancrinite cages with 6 membered ring openings and double six rings. Offretite contains an additional 12 membered ring building unit leading to a more complex porous structure including Gmelinite cages with 8 membered ring entrances and the aforementioned 12 membered rings channels. Offretite also contains the same Cancrinite cages and double-six ring system seen in Erionite.

It has been reported that alkali metal content is detrimental to the stability of zeolite-based catalysts leading to dealumination in hydrothermal conditions (D. W. Breck, Zeolite Molecular Sieves, p490-493). Prior art indicates that ammonium exchange is first carried out to lower the alkali metal content before introducing active metal either for stability reasons or since the alkali metal are a known poison of zeolite acid sites (WO 2008/132452).

It is reported that potassium has a preference for an extra-framework site located within the Cancrinite cage feature common to both structures present in ZSM-34 (W. J. Mortimer, Compilation of extra-framework sites in zeolites and Zeolties, 1986, p474-).

Centi et al. (Applied Catalysis, 1995, p179-259) discuss the impact of dead volumes in zeolites with respect to catalysis. The performance of Cu zeolite Y has been shown to depend on the location of the active metal where Cu located inside the sodalite cage is deemed inaccessible to SCR of NOx with ammonia. The sodalite cage has 6 membered ring openings which do not allow diffusion of reactant gases and so is considered a dead volume.

ZSM-34 can be synthesized using various template agents (e.g. choline, tetramethylammonium, hexamethylenediamine) and OH— sources. Its synthesis was reported in 1978 by Mobil Oil Corporation in U.S. Pat. No. 4,086,186 and a detailed review of synthesis and structure followed in Zeolites, 1986, p474-. The later also indicates that crystal/particle morphology was sensitive to various synthesis parameters. Needle-like morphology, such as that which describes Asbestos, is undesirable for health safety and so other morphologies are preferred. ZSM-34 typically crystallizes with product compositions ranging from about 4 to 15 $SiO_2:Al_2O_3$, with U.S. Pat. No. 4,086,186 indicating 50 as an upper limit. U.S. Pat. No. 4,116,813 reports the use of ZSM-34 in hydrocarbon conversion. A copper containing ZSM-34 (Cu/ZSM-34) is not disclosed.

The synthesis of Erionite and its related materials (e.g. LZ-220) is possible using a number of templates including benzyltrimethylammonium, benzyltriethylammonium and tetramethylammonium as reported in Handbook of Molecular Sieves by R. Szostak.

The synthesis of Offretite and its related materials (TMA-O, and LZ-217) are reported in Handbook of Molecular Sieves by R. Szostak.

U.S. Pat. No. 4,116,813 also discloses the synthesis, structure and use of ZSM-34 in hydrocarbon conversion. It is disclosed that metals of group 1b through 8 can be introduced in to the structure to produce a catalytically active metal. However, DeNOx catalysis is not disclosed and no examples of Cu/ZSM-34 are provided.

Furthermore, Linde Type T is also an intergrowth of Erionite and Offretite reported in U.S. Pat. No. 2,950,952 and Zeolite Molecular Sieve, 1974, 173. The material is synthesized in the presence of sodium and potassium. A Cu containing Linde Type T is not disclosed.

The reduction of nitrogen oxides with ammonia to form nitrogen and $H_2O$ can be catalyzed by metal-promoted zeolites to take place preferentially to the oxidation of ammonia by the oxygen or to the formation of undesirable side products such as $N_2O$, hence the process is often referred to as the "selective" catalytic reduction ("SCR") of nitrogen oxides, and is sometimes referred to herein simply as the "SCR" process.

The catalysts employed in the SCR process ideally should be able to retain good catalytic activity over the wide range of temperature conditions of use, for example, 200° C. to 600° C. or higher, under hydrothermal conditions. Hydrothermal conditions are often encountered in practice, such as during the regeneration of a soot filter, a component of the exhaust gas treatment system used for the removal of particles.

Metal-promoted zeolite catalysts including, among others, iron-promoted and copper-promoted zeolite catalysts, for the selective catalytic reduction of nitrogen oxides with ammonia are known. Iron-promoted zeolite beta (U.S. Pat. No. 4,961,917) has been an effective commercial catalyst for the selective reduction of nitrogen oxides with ammonia. Unfortunately, it has been found that under harsh hydrothermal conditions, for example exhibited during the regeneration of a soot filter with temperatures locally exceeding 700° C., the activity of many metal-promoted zeolites begins to decline. This decline is often attributed to dealumination of the zeolite and the consequent loss of metal-containing active centers within the zeolite.

WO 2008/106519 discloses a catalyst comprising: a zeolite having the CHA crystal structure and a mole ratio of silica to alumina greater than 15 and an atomic ratio of copper to aluminum exceeding 0.25. The catalyst is prepared via copper exchanging $NH_4^+$-form CHA with copper sulfate or copper acetate. The catalyst resulting from copper sulfate ion-exchange exhibits NOx conversion from 45 to 59% at 200° C. and ~82% at 450° C. Copper acetate exchange results in a material with NOx conversion after aging of 70 and 88% at 200 and 450° C., respectively. These materials offer improvement in low temperature performance and hydrothermal stability in comparison to FeBeta. However, Chabazite remains an expensive material due to the cost of the trimethyladamantyl ammonium hydroxide necessary for its synthesis.

WO 2008/132452 discloses a number of zeolite materials that can be loaded with iron and/or copper with improvements in NOx conversion compared to Fe/Beta, Cu/Beta and Cu/ZSM-5. Example 11 indicates Cu/ZSM-34 as such a material. This example states that an ammonium exchange was carried out before an aqueous copper exchange using copper nitrate. It is stated that multiple aqueous ion-exchanges were carried out to target 3 wt % Cu (3.76 wt % CuO). No details of the ion-exchange experiments are disclosed. Additionally, no details of composition parameters for the zeolite are given such as $SiO_2:Al_2O_3$ or alkali metal content. Ammonium exchange is employed to reduce the alkali metal content from zeolites. Although, no alkali metal content is reported it was most probably about 1 wt % $M_2O$ (where M is K or Na) reported on a calcined basis since one ammonium exchange or multiple ammonium exchanges result in a alkali metal content of about 1 wt % $M_2O$ (see example 2, Table 1).

Figure 15 indicates the SCR performance of Cu/ZSM-34 after aging at 750° C. for 24 hours in 5% steam with comparison to other materials, such as CuSAPO-34. The NOx conversions are about 70% and about 88% at 200 and 450° C., respectively. Although no clear mention of test conditions for Cu/ZSM-34 can be found in the disclosure, it can be derived by a comparison of No clear mention of test conditions for Cu/ZSM-34 can be found in the disclosure. Thus, WO 2008/132452 does not disclose a Cu/ZSM-34 product having an alkali content of at least 1.5 wt.-%.

Briend at al. reported that SAPO-34 was unstable to humid environment at temperatures below about 100° C. as reflected in a loss of structure (J. Phys. Chem., 1995, Vol. 99, p 8270-8276). However, at temperatures above 100° C. stability was not an issue. Poshusta et al. observed the same instability to humidity at low temperature with SAPO-34 membranes (J. Membrane Science, 2001, Vol. 186, p 25-40). Even though WO 2008/132452 disclosed very good NOx conversion rates for Cu/SAPO-34, this low temperature instability could limit the use of SAPO-34 in automotive applications even although the material is stable to high temperature hydrothermal aging.

WO 2008/118434 and US 2010/0092362 indicate an Erionite (ERI) material that can retain at least 80% of its surface area and micropore volume after hydrothermal aging at 900° C. in 10% steam for 1 to 16 hours would be suitable for application in SCR. However, no synthesis, compositional, surface area or catalytic data are disclosed. No Cu/ZSM-34 was disclosed.

WO 2010/043891 indicates small pore zeolites (having a maximum ring size of eight tetrahedral atoms), including Erionite (ERI), as improved catalysts in the selective catalytic reduction of $NO_x$ with ammonia. ZSM-34 and Linde Type T are also disclosed. It is indicated that large crystal size results in improved catalyst stability with catalytic data provided for only CuChabazite. NOx conversion is reported at 200° C. and 400° C. Crystals larger than 0.5 micrometers are claimed. No Cu/ZSM-34 data is disclosed.

U.S. Pat. No. 4,220,632 discloses $NH_3$-SCR process using zeolites in the Na- or H-form with pore sizes of 3-10 Angstroms. Zeolite X, Mordenite and a natural zeolite are disclosed in the examples. No Cu/ZSM-34 is disclosed.

US 20090199545, US 20090199546, and US 20090199549 disclose Erionite (ERI), Offretite (OFF) and ZSM-34 as molecular sieves aimed at preventing emission of polychlorinated dibenziodioxins (PCDD) and polychlorinated dibenzofurans (PCDF) typically formed on SCR catalysts. This is achieved through utilizing the molecular sieving properties of these small pore zeolites at downstream side of the SCR catalyst and in the direction of the purified gas stream. It is mentioned that Cu, Co or Fe can be added to these molecular sieves to aid the existing SCR catalyst. However, neither a content of these metals is disclosed nor any synthesis, compositional, surface area or catalytic data are disclosed.

WO 2009/135588 discloses zeolites (Ferrierite, Chabazide and Erionite) with pores small enough to prevent hydrocarbon deactivation of the SCR catalyst based on the same zeolite due to a molecular sieving effect. It is disclosed that these zeolites might contain Cu or Fe in an amount of 0.1 to 10 wt.-%. However, no synthesis, compositional, surface area or catalytic data of Cu-ERI are disclosed.

U.S. Pat. No. 5,041,272 discloses a method of removing nitrogen oxides from exhaust gases containing oxygen and moisture by contacting the gas with a hydrogenated zeolite catalyst impregnated with one or more metals selected from the group of Cu, Zn, V, Cr, Mn, Fe, Co, Ni, Rh, Pd, Pt and Mo. The zeolite should have a silica to alumina ratio of greater than 5 and may be Zeolite of Y type, zeolite of L type, zeolite of offretite-erionite mixed crystal type, zeolite of ferrierite type, zeolite of mordenite type, zeolite of clinoptilotile type and zeolite of ZSM-5 type. However, no synthesis, compositional, surface area or catalytic data of Cu-offretite-erionite are disclosed.

DE 10 2006 060 807 discloses a process for preparing a zeolite material laden with metal and protons, wherein the zeolite material is preferably AEL, BEA, CHA, EUO, FAU, FER, KFI, LTA, LTL, MAZ, MOR, MEL, MTW, LEV, OFF, TON and MFI and the metal is preferably Fe, Ag or Co. However, experimental data are solely disclosed for Fe-BEA.

WO 2008/89957 discloses a catalyst system containing at least two oxides selected from $V_2O_5$, $WO_3$ and $TiO_2$ and a metal doped zeolite. MFI, BEA, MOR, ERI and REY are disclosed as zeolites; Co, Cu and Fe as metal. However, experimental data are solely disclosed for a catalyst system using Fe-BEA.

WO 2008/128748 discloses a catalyst containing different catalytic layers, wherein one layer contains a zeolite, preferably selected from the group consistent of AFI, AEL, BEA, CHA, EUO, FAU, FER, KFI, LTL, MAZ, MFI, MOR, ERI, OFF and TON, doped by a metal, preferably selected from the group consistent of Fe, Cu, Co, Ag or mixtures. However, no synthesis, compositional, surface area or catalytic data of any ERI or OFF zeolite are disclosed.

FeBeta was an effective catalyst for the selective catalytic reduction of NOx with ammonia, but it does not fulfill the low temperature requirements or provide the necessary hydrothermal stability to meet tightening environmental regulations. WO 2008/106519, WO 2008/132452 and WO 2008/118434 all disclose CuSSZ-13 as a SCR catalyst which improves low temperature performance and hydrothermal stability when compared to FeBeta. SSZ-13 is a chabazite technology where significant cost is contributed by the expensive template, trimethyladamantyl ammonium hydroxide, needed to synthesize the parent zeolite prior to Cu modification. Cu/SAPO-34 exhibits high temperature hydrothermal stability and good SCR performance at low cost but, concerns over instability in humid conditions at low temperatures may hinder commercialization of this technology.

Thus, there is an on-going task to provide cost-effective hydrothermally stable catalysts for SCR applications. Lower cost catalysts are desired which exhibit similar SCR performance and stability to the state of the art SCR catalysts. In addition, the catalysts should show high activity over a wide temperature range. Hydrothermal stability to temperatures greater than 750° C. is desired. The specific requirement on hydrothermal stability is dependent on the configuration of the catalyst system utilized in the exhaust treatment.

SUMMARY

The present invention includes the following embodiments, wherein these include the specific combinations of embodiments as indicated by the respective interdependencies defined therein:

1. A copper containing ZSM-34, OFF and/or ERI zeolitic material having a silica to alumina mole ratio ranging from 4 to 50 and a copper content, reported as CuO, ranging from 1 to 10 wt.-%, based on the total weight of the calcined zeolitic material, and having an alkali metal content, reported as metal oxide, ranging from 1.5 to 12 wt.-%.
2. Copper containing ZSM-34, OFF and/or ERI zeolitic material of embodiment 1 having an alkali metal content, reported as metal oxide, ranging from 1.5 to 5 wt.-%.
3. Copper containing ZSM-34, OFF and/or ERI zeolitic material of embodiments 1 or 2 having a copper content, reported as CuO, ranging from 1 to 5 wt.-%, based on the total weight of the calcined zeolitic material for fresh or a 750° C. aged zeolitic material or ranging from 1 to 3.5 wt.-%, based on the total weight of the calcined zeolitic material, for 800° C. aged zeolitic material.
4. Copper containing ZSM-34, OFF and/or ERI zeolitic material of any of embodiments 1 to 3 having a silica to alumina mole ratio ranging from 8 to 15.
5. Copper containing ZSM-34, OFF and/or ERI zeolitic material of any of embodiments 1 to 4,
    wherein the copper containing ZSM-34, OFF and/or ERI zeolitic material has a mole ratio of silica to alumina from 10 to 15 and
    the copper containing ZSM-34, OFF and/or ERI zeolitic material being fresh or aged at 750° C. in 10% steam for 24 hours, the atomic ratio of copper to aluminum ranges from 0.04 to 0.5; or
    the copper containing ZSM-34, OFF and/or ERI zeolitic material being aged at 800° C. in 10% steam for 12 hours, the atomic ratio of copper to aluminum ranges from 0.04 to 0.28; or
    wherein the copper containing ZSM-34, OFF and/or ERI zeolitic material has a mole ratio of silica to alumina from 4 to 10 and
    the copper containing ZSM-34, OFF and/or ERI zeolitic material being fresh or aged at 750° C. in 10% steam for 24 hours, the atomic ratio of copper to aluminum ranges from 0.02 to 0.5; or
    if the copper containing ZSM-34, OFF and/or ERI zeolitic material being aged at 800° C. in 10% steam for 12 hours, the atomic ratio of copper to aluminum ranges from 0.02 to 0.2
6. Copper containing ZSM-34, OFF and/or ERI zeolitic material of any of embodiments 1 to 5,
    wherein the copper containing ZSM-34, OFF and/or ERI zeolitic material has a mole ratio of silica to alumina from 4 to 15, the atomic ratio of the sum of two times Cu and alkali metal to aluminum (2Cu+M)/Al ranges from 0.21 to 1 for fresh material, aged material at 750° C. in 10% steam for 24 hours or aged material at 800° C. in 10% steam for 12 hours.
7. Copper containing ZSM-34, OFF and/or ERI zeolitic material of any of embodiments 1 to 6,
    wherein the copper containing ZSM-34, OFF and/or ERI zeolitic material has a mole ratio of silica to alumina from 10 to 15, the atomic ratio of copper to proton ranges from 0.05 to 1000 for fresh material, aged material at 750° C. in 10% steam for 24 hours or aged material at 800° C. in 10% steam for 12 hours;
    wherein the copper containing ZSM-34, OFF and/or ERI zeolitic material has a mole ratio of silica to alumina from 4 to 10, the atomic ratio of copper to proton ranges from 0.02 to 500 for fresh material, aged material at 750° C. in 10% steam for 24 hours or aged material at 800° C. in 10% steam for 12 hours.
8. Copper containing ZSM-34, OFF and/or ERI zeolitic material of any of embodiments 1 to 7,
    wherein measured at a gas hourly volume based space velocity of 80000 $h^{-1}$—the fresh copper containing ZSM-34, OFF and/or ERI zeolitic material exhibits a NO conversion at 200° C. of at least 50% and at 450° C. of at least 70%;
    the 750° C.-aged copper containing ZSM-34, OFF and/or ERI zeolitic material exhibits NO conversion at 200° C. is at least 50% and at 450° C. at least 65%;
    the 800° C.-aged copper containing ZSM-34, OFF and/or ERI zeolitic material exhibits NO conversion at 200° C. is at least 50% and at 450° C. at least 70%.
9. Copper containing ZSM-34, OFF and/or ERI zeolitic material of any of embodiments 1 to 8,
    wherein the Langmuir surface area, determined according to DIN ISO 9277, of the copper containing ZSM-34, OFF and/or ERI zeolitic material is in the range from 400 to 900 $m^2/g$ and the surface area of the copper containing ZSM-34, OFF and/or ERI zeolitic material retains after exposure to a temperature of 750° C. in the present of up to 10 volume percent water vapor for a time ranging from 1 to 48 hours at least 70% of its fresh surface area.
10. Copper containing ZSM-34, OFF and/or ERI zeolitic material of any of embodiments 1 to 9, wherein ZSM-34 is used.
11. A catalyst containing a copper containing ZSM-34, OFF and/or ERI zeolitic material of any of embodiments 1 to 10 disposed on a substrate.
12. A process of for the preparation of a copper containing ZSM-34, OFF and/or ERI zeolitic material of any of embodiments 1 to 10, wherein no ammonium exchange is conducted.
13. A method of using a catalyst containing a copper containing ZSM-34, OFF and/or ERI zeolitic material of any of embodiments 1 to 10 or a catalyst of embodiment 11 for the selective reduction (SCR) of nitrogen oxides $NO_x$; for the oxidation of $NH_3$; for the decomposition of $N_2O$; for soot oxidation; for emission control in Advanced Emission Systems; as additive in fluid catalytic cracking (FCC) processes; as catalyst in organic conversion reactions; or as catalyst in stationary source processes.
14. An exhaust gas treatment system comprising an exhaust gas stream containing ammonia and a catalyst containing a copper containing ZSM-34, OFF and/or ERI zeolitic material of any of embodiments 1 to 10 or embodiment 11, a soot filter and a diesel oxidation catalyst.
15. A method of selectively reducing nitrogen oxides $NO_x$, wherein a gaseous stream containing nitrogen oxides $NO_x$, is contacted with copper containing ZSM-34, OFF and/or ERI zeolitic material of any of embodiments 1 to 10 or of embodiment 11.

DETAILED DESCRIPTION

Surprisingly, it was found that Cu/ZSM-34 catalysts containing high alkali metal contents can exhibit high performance even after severe hydrothermal aging when the Cu content is carefully controlled.

Embodiments of the invention will indicate the importance of the alkali metal (potassium) in both the stability and catalytic performance since it can impose control on the location of the catalytically active transition metal introduced (e.g. copper).

Without wishing to be bound by any theory, it is believed that more active metal must be introduced when the alkali metal cation content is lowered to obtain similar catalytic performance. An explanation could be that when the alkali metal, which resides in the Cancrinite cage, is removed by ion-exchange this would allow the active metal to occupy the Cancrinite cage. The Cancrinite cage has 6 membered ring openings similar to that of the prementioned sodalite cage. Consequently, more active metal would need to be introduced to compensate for active metal lost to catalysis since the Cancrinite cage would be considered inaccessible Cancrinite cage to catalysis. It was found that higher alkali contents lead to an effective catalyst even when lower amounts of Cu are introduced leading to a more cost efficient process.

Cu/ZSM-34, Cu/OFF or Cu/ERI offers significant cost reduction over CuSSZ-13 due to the use of lower cost templates. Additionally, no stability issues exist for this aluminosilicate based composition. Furthermore, the avoidance of ammonium exchange, calcination steps and/or other process steps required to remove alkali metal leads to simplification and cost reduction in the production of Cu/ZSM-34. This alkali-containing composition also facilitates the introduction of active metal during the hydrothermal synthesis. Additionally, more effective catalyst is produced since less Cu is required to provide similar or improved catalytic performance to that of a Cu/ZSM-34 catalyst with lower alkali metal content.

Therefore, embodiments of the present invention relates to a copper containing ZSM-34, OFF and/or ERI zeolitic material having a silica to alumina mole ratio ranging from about 4 to about 50 and a copper content, reported as CuO, ranging from about 1 to about 10 wt.-%, based on the total weight of the calcined zeolitic material, and an alkali metal content, reported as metal oxide, ranging from about 1.5 to about 12 wt.-%. All values of chemical analysis are reported on a calcined basis.

For specific embodiments of the invention, all intergrowths of Erionite and Offretite are considered to be ZSM-34. Preferably the copper containing ZSM-34 zeolitic material is an aluminosilicate composition. In addition, in this invention Linde Type T is considered as an intergrowth structure of Offretite and Erionite similar to ZSM-34.

As used in this specification and the appended claims, the singular forms "a", "an" and "the" include plural referents unless the context clearly indicates otherwise. Thus, for example, reference to "a catalyst" includes a mixture of two or more catalysts, and the like.

$SiO_2/Al_2O_3$:

Preferably the copper containing ZSM-34, OFF and/or ERI zeolitic material has a mole ratio of silica to alumina from about 4 to about 15. More preferred the copper containing ZSM-34, OFF and/or ERI, preferably ZSM-34, has a mole ratio of silica to alumina in the range from about 8 to about 15, even more preferred in the range from about 10 to about 15.

Alkali Metal Content:

Preferably the copper containing ZSM-34, OFF and/or ERI zeolitic material has an alkali metal content, reported as metal oxide, ranging from about 1.5 to about 5 wt.-%. More preferred the copper containing ZSM-34, OFF and/or ERI, preferably ZSM-34, zeolitic material has an alkali metal content, reported as metal oxide, ranging from about 2 to about 5 wt.-%, even more preferred ranging from about 2 to about 2.5 wt.-%. All values are reported on a calcined basis (i.e. free of water, organic and ammonium). It should be noted that the convention of reporting chemical analysis on a metal oxide basis does not reflect the speciation of the alkali metal within the zeolite.

Wt. % Copper:

If the copper containing ZSM-34, OFF and/or ERI zeolitic material is fresh or was aged at 750° C. in 10% steam for 24 hours, the copper content, reported as CuO, is preferably ranging from about 1 to about 7.5 wt.-%. More preferred the copper content of the copper containing ZSM-34, OFF and/or ERI, preferably ZSM-34, zeolitic material, ranges from about 1 to about 5 wt.-%, even more preferred ranging from about 2 to about 4.5 wt.-%.

If the copper containing ZSM-34, OFF and/or ERI zeolitic material was aged at 800° C. in 10% steam for 12 hours, the copper content, reported as CuO, is preferably ranging from about 1 to about 3.9 wt.-%. More preferred the copper content of the copper containing ZSM-34, OFF and/or ERI, preferably ZSM-34, zeolitic material, ranges from about 1 to about 3.5 wt.-%. Even more preferred the copper content ranges from about 1 to about 3.25 wt.-%, even more preferred ranging from about 2 to about 3 wt.-%.

All wt.-% values are reported on a calcined basis (i.e. free of water, organic and ammonium). It should be noted that the convention of reporting chemical analysis on a metal oxide basis does not reflect the speciation of the copper within the zeolite.

Cu/Al:

If the copper containing ZSM-34, OFF and/or ERI, preferably ZSM-34, zeolitic material has a mole ratio of silica to alumina from about 10 to about 15 and if the copper containing ZSM-34, OFF and/or ERI zeolitic material is fresh or was aged at 750° C. in 10% steam for 24 hours, the atomic ratio of copper to aluminum is preferably ranging from about 0.04 to about 0.5. More preferred the atomic ratio of copper to aluminum ranges from about 0.04 to about 0.35, even more preferred ranging from about 0.09 to about 0.3.

If the copper containing ZSM-34, OFF and/or ERI, preferably ZSM-34, zeolitic material has a mole ratio of silica to alumina from about 10 to about 15 and if the copper containing ZSM-34, OFF and/or ERI zeolitic material was aged under at 800° C. in 10% steam for 12 hours, the atomic ratio of copper to aluminum is preferably ranging from about 0.04 to about 0.28. More preferred the atomic ratio of copper to aluminum ranges from about 0.04 to about 0.22, even more preferred ranging from about 0.09 to about 0.2.

If the copper containing ZSM-34, OFF and/or ERI, preferably ZSM-34, zeolitic material has a mole ratio of silica to alumina from about 4 to about 10 and if the copper containing ZSM-34, OFF and/or ERI zeolitic material is fresh or was aged at 750° C. in 10% steam for 24 hours, the atomic ratio of copper to aluminum is preferably ranging from about 0.02 to about 0.5. More preferred the atomic ratio of copper to aluminum ranges from about 0.02 to about 0.38. Even more preferred the atomic ratio of copper to aluminum ranges from about 0.02 to about 0.25, even more preferred ranging from about 0.04 to about 0.22.

If the copper containing ZSM-34, OFF and/or ERI, preferably ZSM-34, zeolitic material has a mole ratio of silica to alumina from about 4 to about 10 and if the copper containing ZSM-34, OFF and/or ERI zeolitic material was aged at 800° C. in 10% steam for 12 hours, the atomic ratio of copper to aluminum is preferably ranging from about 0.02 to about 0.2. More preferred the atomic ratio of copper to aluminum ranges from about 0.02 to about 0.17. Even more preferred the atomic ratio of copper to aluminum ranges from about 0.02 to about 0.16, even more preferred ranging from about 0.04 to about 0.14.

(2Cu+M)/Al:

If the copper containing ZSM-34, OFF and/or ERI, preferably ZSM-34, zeolitic material has a mole ratio of silica to alumina from about 10 to about 15 and if the copper containing ZSM-34, OFF and/or ERI zeolitic material is fresh or was aged under at 750° C. in 10% steam for 24 hours, the atomic ratio of the sum of two times Cu and alkali metal to aluminum (2Cu+M)/Al is preferably ranging from about 0.21 to about 1. More preferred the atomic ratio of the sum of two times Cu and alkali metal to aluminum ranges from about 0.24 to about 1, even more preferred ranging from about 0.34 to about 1.

If the copper containing ZSM-34, OFF and/or ERI, preferably ZSM-34, zeolitic material has a mole ratio of silica to alumina from about 10 to about 15 and if the copper containing ZSM-34, OFF and/or ERI zeolitic material was aged under at 800° C. in 10% steam for 12 hours, the atomic ratio of the sum of two times Cu and alkali metal to aluminum (2Cu+M)/Al is preferably ranging from about 0.21 to about 1. More preferred the atomic ratio of the sum of two times Cu and alkali metal to aluminum ranges from about 0.24 to about 1, even more preferred ranging from about 0.34 to about 0.83.

If the copper containing ZSM-34, OFF and/or ERI, preferably ZSM-34, zeolitic material has a mole ratio of silica to alumina from about 4 to about 10 and if the copper containing ZSM-34, OFF and/or ERI zeolitic material is fresh or was aged under at 750° C. in 10% steam for 24 hours, the atomic ratio of the sum of two times Cu and alkali metal to aluminum (2Cu+M)/Al is preferably ranging from about 0.21 to about 1. More preferred the atomic ratio of the sum of two times Cu and alkali metal to aluminum ranges from about 0.24 to about 1, even more preferred ranging from about 0.17 to about 0.73.

If the copper containing ZSM-34, OFF and/or ERI, preferably ZSM-34, zeolitic material has a mole ratio of silica to alumina from about 4 to about 10 and if the copper containing ZSM-34, OFF and/or ERI zeolitic material was aged under at 800° C. in 10% steam for 12 hours, the atomic ratio of the sum of two times Cu and alkali metal to aluminum (2Cu+M)/Al is preferably ranging from about 0.21 to about 1. More preferred the atomic ratio of the sum of two times Cu and alkali metal to aluminum ranges from about 0.21 to about 0.96. Even more preferred the atomic ratio of the sum of two times Cu and alkali metal to aluminum (2Cu+M)/Al ranges from about 0.24 to about 0.93, even more preferred ranging from about 0.17 to about 0.58.

The atomic ratio of transition metal and alkali metal cations occupying the extra-framework positions is expressed on a molar basis of univalent charge (i.e. 1 mole of $Cu^{2+}$ is 2 moles of univalent charge) to the number of moles $Al^{3+}$. In other words this ratio reflects a fraction of the occupied exchange capacity assuming every mole of Al allows for a mole of univalent charge to reside in extra-framework positions within the zeolite.

Cu/H:

If the copper containing ZSM-34, OFF and/or ERI, preferably ZSM-34, zeolitic material has a mole ratio of silica to alumina from about 10 to about 15 and if the copper containing ZSM-34, OFF and/or ERI zeolitic material is fresh or was aged at 750° C. in 10% steam for 24 hours, the atomic ratio of copper to proton is preferably ranging from about 0.05 to about 1000. More preferred the atomic ratio of copper to proton ranges from about 0.05 to about 100. Even more the atomic ratio of copper to proton ranges from about 0.05 to about 30, even more preferred ranging from about 0.13 to about 10.

If the copper containing ZSM-34, OFF and/or ERI, preferably ZSM-34, zeolitic material has a mole ratio of silica to alumina from about 10 to about 15 and if the copper containing ZSM-34, OFF and/or ERI zeolitic material was aged at 800° C. in 10% steam for 12 hours, the atomic ratio of copper to proton is preferably ranging from about 0.05 to about 1000. More preferred the atomic ratio of copper to proton ranges from about 0.05 to about 50. Even more the atomic ratio of copper to proton ranges from about 0.05 to about 10, even more preferred ranging from about 0.13 to about 1.2.

If the copper containing ZSM-34, OFF and/or ERI, preferably ZSM-34, zeolitic material has a mole ratio of silica to alumina from about 4 to about 10 and if the copper containing ZSM-34, OFF and/or ERI zeolitic material is fresh or was aged at 750° C. in 10% steam for 24 hours, the atomic ratio of copper to proton is preferably ranging from about 0.02 to about 500. More preferred the atomic ratio of copper to proton ranges from about 0.02 to about 50. Even more the atomic ratio of copper to proton ranges from about 0.02 to about 5, even more preferred ranging from about 0.05 to about 0.8.

If the copper containing ZSM-34, OFF and/or ERI, preferably ZSM-34, zeolitic material has a mole ratio of silica to alumina from about 4 to about 10 and if the copper containing ZSM-34, OFF and/or ERI zeolitic material was aged at 800° C. in 10% steam for 12 hours, the atomic ratio of copper to proton is preferably ranging from about 0.02 to about 500. More preferred the atomic ratio of copper to proton ranges from about 0.02 to about 10. Even more the atomic ratio of copper to proton ranges from about 0.02 to about 5, even more preferred ranging from about 0.05 to about 0.33.

Surface Area:

Preferably the Langmuir surface area, determined according to DIN ISO 9277, of the copper containing ZSM-34, OFF and/or ERI zeolitic material is in the range from about 400 to about 900 $m^2/g$.

If the copper containing ZSM-34, OFF and/or ERI, preferably ZSM-34, zeolitic material is fresh, the Langmuir surface area is more preferred in the range from about 500 to about 800 $m^2/g$, and even more preferred in the range from about 600 to about 700 $m^2/g$, even more preferred in the range from about 650 to about 700 $m^2/g$.

If the copper containing ZSM-34, OFF and/or ERI, preferably ZSM-34, zeolitic material was aged at 750° C. in 10% steam for 24 hours, the Langmuir surface area is more preferred in the range from about 450 to about 800 $m^2/g$, and even more preferred in the range from about 500 to about 700 $m^2/g$, even more preferred in the range from about 550 to about 650 $m^2/g$.

If the copper containing ZSM-34, OFF and/or ERI, preferably ZSM-34, zeolitic material was aged at 800° C. in 10% steam for 12 hours, the Langmuir surface area is more preferred in the range from about 450 to about 800 $m^2/g$, and even more preferred in the range from about 450 to about 700 $m^2/g$, even more preferred in the range from about 500 to about 650 $m^2/g$.

Retention of Surface Area after Aging at 750° C.:

Preferably the surface area of the copper containing ZSM-34, OFF and/or ERI, preferably ZSM-34, zeolitic material after exposure to a temperature of 750° C. in the present of up to 10 volume percent water vapor for a time ranging from about 1 to about 48 hours, preferably for a time ranging from about 6 to about 48 hours, even more preferred for a time ranging from about 6 to about 24 hours, retains at least about 70%, even more preferred retains at least about 75%, even more preferred retains at least about 80%, even more preferred retains at least about 82%, of its fresh surface area.

Retention of Surface Area after Aging at 800° C.:

Preferably the surface area of the copper containing ZSM-34, OFF and/or ERI, preferably ZSM-34, zeolitic material after exposure to a temperature of 800° C. in the present of up to 10 volume percent water vapor for a time ranging from about 1 to about 48 hours, preferably for a time ranging from about 6 to about 48 hours, even more preferred for a time ranging from about 6 to about 24 hours, retains at least about 60%, preferably at least about 65%, even more preferred retains at least about 70%, even more preferred retains at least about 75%, of its fresh surface area.

Free Copper:

In addition to the copper that is exchanged to increase the level of copper associated with the exchanged sites in the structure of the zeolite, non-exchanged copper in salt from may be present in the ZSM-34, OFF and/or ERI, preferably ZSM-34, zeolitic material, so called free copper.

Additional Metal:

The copper containing ZSM-34, OFF and/or ERI, preferably ZSM-34, zeolitic material may contain one or more transition metals. Preferably the ZSM-34, OFF and/or ERI, preferably ZSM-34, zeolitic material may contain transition metals capable of oxidizing NO to $NO_2$ and/or storing $NH_3$. The transition metal is preferably selected from the group consisting of Fe, Co, Ni, Zn, Y, Ce, Zr and V. Generally, all suitable sources for Fe, Co, Ni, Zn, Y, Ce, Zr and V can be employed. By way of example, nitrate, oxalate, sulphate, acetate, carbonate, hydroxide, acetylacetonate, oxide, hydrate, and/or salts such as chloride, bromide, iodide may be mentioned.

In addition, the copper containing ZSM-34, OFF and/or ERI, preferably ZSM-34, zeolitic material may contain one or more lanthanides. A preferred lanthanide source is, among others, lanthanum nitrate.

In addition, the copper containing ZSM-34, OFF and/or ERI, preferably ZSM-34, zeolitic material may contain one or more precious metals (e.g. Pd, Pt).

TOC:

Preferably, the calcined copper containing ZSM-34, OFF and/or ERI, preferably ZSM-34, zeolitic material has a TOC content of 0.1 wt.-% or less, based on the total weight of the ZSM-34, OFF and/or ERI, preferably ZSM-34, zeolitic material.

Thermal Stability:

Preferably, the calcined copper containing ZSM-34, OFF and/or ERI, preferably ZSM-34, zeolitic material has a thermal stability, determined via differential thermal analysis or differential scanning calorimetry, in the range of from about 900 to about 1400° C., preferably in the range of from about 1100 to about 1400° C., more preferably in the range of from about 1150 to about 1400° C. For example, the measurement of thermal stability is described in PCT/EP2009/056036 at page 38.

ZSM-34, OFF and/or ERI:

Preferably ZSM-34 zeolitic material is used as zeolitic material

SCR Activity/NO Conversion:

All NO conversions described below are measured under steady state conditions at maximum $NH_3$-slip conditions in a gas mixture of 500 ppm NO, 500 ppm $NH_3$, 10% $O_2$, 5% $H_2O$, balance $N_2$.

Fresh:

Preferably the fresh copper containing ZSM-34, OFF and/or ERI, preferably ZSM-34, zeolitic material exhibits a NOx conversion at 200° C. of at least about 75%, more preferred of at least about 80%, even more preferred of at least about 85%, even more preferred of at least about 90, measured at a gas hourly volume based space velocity of 30000 $h^{-1}$.

Preferably the fresh copper containing ZSM-34, OFF and/or ERI, preferably ZSM-34, zeolitic material exhibits a NOx conversion at 450° C. of at least about 80%, more preferred of at least about 85%, even more preferred of at least about 90%, even more preferred of at least about 95%, measured at a space velocity of gas hourly space velocity of 30000 $h^{-1}$.

Preferably the fresh copper containing ZSM-34, OFF and/or ERI, preferably ZSM-34, zeolitic material exhibits a NO conversion at 200° C. of at least about 50%, more preferred of at least about 60%, even more preferred of at least about 70%, even more preferred of at least about 80%, measured at a gas hourly volume based space velocity of 80000 $h^{-1}$.

Preferably the fresh copper containing ZSM-34, OFF and/or ERI, preferably ZSM-34, zeolitic material exhibits a NOx conversion at 450° C. of at least about 70%, more preferred of at least about 75%, even more preferred of at least about 80%, even more preferred of at least about 85%, measured at a space velocity of gas hourly space velocity of 80000 $h^{-1}$.

Aged: 750° C.

The copper containing ZSM-34, OFF and/or ERI, preferably ZSM-34, were hydrothermally aged in a tube furnace in a gas flow containing 10% $H_2O$, 10% $O_2$, balance $N_2$ at a space velocity of 12,500 $h^{-1}$ for 24 hrs at 750° C. Preferably the 750° C.-aged NO conversion at 200° C. is at least about 70%, more preferred at least about 75%, even more preferred at least about 80%, even more preferred at least about 85%, measured at a space velocity of gas hourly space velocity of 30000 $h^{-1}$.

Preferably the 750° C.-aged copper containing ZSM-34, OFF and/or ERI, preferably ZSM-34, zeolitic material exhibits a NO conversion at 450° C. is at least about 70%, more preferred at least about 75%, even more preferred at least about 80%, even more preferred at least about 85%, measured at a space velocity of gas hourly space velocity of 30000 $h^{-1}$.

Preferably the 750° C.-aged copper containing ZSM-34, OFF and/or ERI, preferably ZSM-34, zeolitic material exhibits a NO conversion at 200° C. is at least about 50%, more preferred at least about 60%, even more preferred at least about 65%, even more preferred at least about 70%, measured at a space velocity of gas hourly space velocity of 80000 $h^{-1}$.

Preferably the 750° C.-aged copper containing ZSM-34, OFF and/or ERI, preferably ZSM-34, zeolitic material exhibits a NO conversion at 450° C. is at least about 65%, more preferred at least about 70%, even more preferred at least about 75%, even more preferred at least about 80%, measured at a space velocity of gas hourly space velocity of 80000 $h^{-1}$.

Aged: 800° C.

The copper containing ZSM-34, OFF and/or ERI, preferably ZSM-34, were hydrothermally aged in a tube furnace in a gas flow containing 10% $H_2O$, 10% $O_2$, balance $N_2$ at a space velocity of 12,500 $h^{-1}$ for 24 hrs at 800° C.

Preferably the 800° C.-aged copper containing ZSM-34, OFF and/or ERI, preferably ZSM-34, zeolitic material exhibits a NO conversion at 200° C. is at least about 70%, more preferred at least about 75%, even more preferred at least about 80%, even more preferred at least about 85%, measured at a space velocity of gas hourly space velocity of 30000 $h^{-1}$.

Preferably the 800° C.-aged copper containing ZSM-34, OFF and/or ERI, preferably ZSM-34, zeolitic material exhibits a NO conversion at 450° C. is at least about 70%, more preferred at least about 75%, even more preferred at least about 80%, even more preferred at least about 85%, measured at a space velocity of gas hourly space velocity of 30000 $j^{-1}$.

Preferably the 800° C.-aged copper containing ZSM-34, OFF and/or ERI, preferably ZSM-34, zeolitic material exhibits a NO conversion at 200° C. is at least about 50%, more preferred at least about 60%, even more preferred at least about 65%, even more preferred at least about 70%, measured at a space velocity of gas hourly space velocity of 80000 h$^{-1}$.

Preferably the 800° C.-aged copper containing ZSM-34, OFF and/or ERI, preferably ZSM-34, zeolitic material exhibits a NO conversion at 450° C. is at least about 70%, more preferred at least about 75%, even more preferred at least about 80%, even more preferred at least about 85%, measured at a space velocity of gas hourly space velocity of 80000 h$^{-1}$.

As the higher space velocity of 80000 h$^{-1}$ differentiates the performance of the different zeolitic materials more effectively, this space velocity is preferred.

The SCR activity measurement has been demonstrated in the literature, for example WO 2008/106519 and WO 2008/118434.

In addition, the present invention relates to a process for the preparation of copper containing ZSM-34, OFF and/or ERI zeolitic material having a silica to alumina mole ratio ranging from about 4 to about 50 and a copper content, reported as CuO, ranging from about 1 to 10 wt.-%, based on the total weight of the calcined zeolitic material and having an alkali metal content, reported as metal oxide, ranging from about 1.5 to 12 wt.-%, wherein no ammonium exchange is conducted. All values are reported on a calcined basis.

Copper Source:

Generally, all suitable sources for Cu can be employed. By way of example, copper (II) oxide, copper acetate, copper nitrate, copper chloride, copper fluoride, copper sulfate, copper carbonate, ammoniacal solutions of copper ions, and copper oxalate may be mentioned. Preferably, an aqueous solution of at least one Cu salt or oxide is employed. Preferred are copper acetate and/or an ammoniacal solutions of copper ions for instance copper tetraamine. The use of a mixture of two or more suitable sources for Cu may be mentioned.

Ammoniacal Solutions of Copper Ions:

Panias et al. (Oryktos Ploutos (2000), 116, 47-56) report the speciation of divalent copper ions in aqueous ammoniacal solutions. Amino complexes of divalent copper $Cu(NH_3)_n^{2+}$ are in practice the predominant forms in which copper is encountered in mildly acidic to strongly alkaline ammoniacal solutions. The ion $Cu(NH_3)_4^{2+}$ is the most important ion of the $Cu^{2+}$—$NH_3$—$H_2O$ system. It shows a wide region of stability varying from mildly acidic solutions with a pH of 5 to strongly alkaline solutions with a pH of 14. The hydroxyl complexes of divalent copper are met with in the $Cu^{2+}$—$NH_3$—$H_2O$ system only in very strongly alkaline solutions with a pH greater than 12 and in dilute ammoniacal solutions with a total ammonia concentration less than 0.1M. In ammoniacal solutions copper is encountered in the form of free $Cu^{2+}$ ions only in highly acidic aqueous solutions.

Synthesis of the ZSM-34, OFF and/or ERI:

Synthesis of ZSM-34 structure can be carried out according to various techniques known in the art (for example U.S. Pat. No. 4,086,186, and Zeolites, 1986, p 474; Handbook of Molecular Sieves by R. Szostak).

Concentration:

The copper concentration of the liquid copper solution used in the copper ion-exchange is preferably in the range from about 0.001 to about 1 molar, more preferred in the range from about 0.01 to about 0.5 molar, even more preferred in the range from about 0.05 to about 0.3 molar, even more preferred in the range from about 0.05 to about 0.2 molar.

Liquid:Solid-Ratio:

The liquid to solid ratio which is defined here as the weight of water and copper salt used to prepare the Cu solution relative to the dry weight of the starting zeolite used in the copper exchange step is preferably in the range from about 0.1 to about 800, more preferred in the range from about 2 to about 80, even more preferred in the range from about 2 to about 20, even more preferred in the range from about 2 to about 10, even more preferred in the range from about 4 to about 8.

Reaction Temperature:

The reaction temperature of the copper-exchange step is preferably in the range of about 15 to about 100° C., more preferred in the range of about 20 to about 60° C. In the case where a ammoniacal solutions of copper ions is used as copper source, the reaction temperature is preferably in the range of about 20 to about 35° C., even more preferred in the range of about 20 to about 25° C.

Addition Order of Reactants:

The reactants zeolite, copper source and water may be added in any order. The zeolite can be added to a premade solution of copper salt or complex, which can be at room temperature or already preheated to the ion-exchange temperature. Alternatively, the zeolite can be preslurried in deionized water followed by addition of copper salt or complex at room temperature or already preheated to the ion-exchange temperature. Additionally, the zeolite powder or filtercake can be preslurried in an amount of water to enable transportation to the reaction vessel by pumping and added to a solution of copper acetate. Again this can be done with or without preheating.

Since the invention facilitates the accomodation of a high loading of alkali metal it can be conceived that Cu can be introduced during the hydrothermal crystallization of the material. A preferred embodiment of the invention is for Cu to be introduced via any suitable copper source (Cu salts, copper oxides, copper complexes) during the hydrothermal crystallization. A more preferred source would be an ammoniacal solution of copper for instance copper tetraamine.

Reaction Time:

The reaction time of the ion-exchange step is preferably in the range of about 1 second to about 48 hours, more preferred in the range of about 30 seconds to about 8 hours, even more preferred in the range of about 1 minute to about 5 hours, even more preferred in the range of about 10 minutes to about 1 hour.

Reaction Conditions:

The aqueous solution is preferably suitably stirred. Typical values as far as said stirring or rotation is concerned are in the range of from 10 to 500 rpm (revolutions per minute). In general, the stirring speed is decreased as the reactor size increases.

pH: use of Acidic Additives:

Preferably, the pH of the ion-exchange step is in the range of about 1 to about 6, more preferably in the range of about 2 to about 6, and even more preferably in the range of about 3 to about 5.5. In the case where an ammoniacal solution of copper ions is used as copper source the pH of the ion-exchange step is preferably in the range of about 5 to about 14, more preferably in the range of about 6 to about 12, and even more preferably in the range of about 8 to about 11.

Depending on the starting materials employed, it may be necessary to adjust the pH of the aqueous solution so that the pH has above-described values. Preferably, the pH is adjusted to above-described values using acetic acid or ammonia which may be added as aqueous solution.

Cu:Al in Copper Exchange Step:

Using copper acetate, the atomic ratio of Cu to Al in the copper solution for the copper-exchange step is preferably in the range of about 0.25 to about 2, more preferred in the range from about 0.5 to 2, even more preferred in the range from about 0.5 to 1.5, even more preferred in the range from about 0.5 to about 1.2. Using ammoniacal solutions of copper ions, the ratio of Cu to Al is preferably in the range of about 0.001 to about 1, more preferred in the range from about 0.25 to about 0.8, even more preferred in the range from about 0.25 to about 0.6, even more preferred in the range from about 0.25 to about 0.5.

Repeating Ion-Exchange:

The copper-exchange step may be repeated for 0 to 10 times, preferably 0 to 2 times.

Post Treatment:

After the copper exchange step, the exchange slurry containing the inventive copper containing ZSM-34, OFF and/or ERI, preferably ZSM-34, zeolitic material is suitably separated from the mother liquor. Prior to separation, the temperature of the mother liquor may be suitably decreased to a desired value employing a suitable cooling rate. This separation can be effected by all suitable methods known to the skilled person. The ZSM-34, OFF and/or ERI, preferably ZSM-34, zeolitic material may be washed at least once with a suitable washing agent known to the skilled person. After separation and optionally washing, the copper containing ZSM-34, OFF and/or ERI, preferably ZSM-34, zeolitic material may be dried and calcined.

Shape:

The ZSM-34, OFF and/or ERI, preferably ZSM-34, zeolitic material or copper containing ZSM-34, OFF and/or ERI, preferably ZSM-34, according to the present invention may be provided in the form of a powder or a sprayed material. In general, the powder or sprayed material can be shaped without any other compounds, e.g. by suitable compacting, to obtain moldings of a desired geometry, e.g. tablets, cylinders, spheres, or the like.

By way of example, the powder or sprayed material is admixed with or coated by a suitable refractory binder. By way of example, the binder may be a zirconium precursor. The powder or the sprayed material, optionally after admixing or coating by a suitable refractory binder, may be formed into a slurry, for example with water, which is deposited upon a suitable refractory carrier.

The Cu-ZSM-34, OFF and/or ERI, preferably ZSM-34, zeolitic material of the present invention may also be provided in the form of extrudates, pellets, tablets or particles of any other suitable shape, for use as a packed bed of particulate catalyst, or as shaped pieces such as plates, saddles, tubes, or the like.

Thus, the present invention relates to a catalyst containing a copper containing ZSM-34, OFF and/or ERI, preferably ZSM-34, zeolitic material disposed on a substrate.

The substrate may be any of those materials typically used for preparing catalysts, and will usually comprise a ceramic or metal honeycomb structure. Any suitable substrate may be employed, such as a monolithic substrate of the type having fine, parallel gas flow passages extending therethrough from an inlet or an outlet face of the substrate, such that passages are open to fluid flow therethrough (referred to as honeycomb flow through substrates). The substrate can also be a wall-flow filter substrate, where the channels are alternately blocked, allowing a gaseous stream entering the channels from one direction (inlet direction), to flow through the channel walls and exit from the channels from the other direction (outlet direction). In addition, suitable carriers/substrates as well as suitable coating processes are described in the international patent application having the application number PCT/EP2009/056036 and in WO 2008/106519. PCT/EP2009/056036 and WO 2008/106519 are incorporated by reference.

In general, the copper containing ZSM-34, OFF and/or ERI, preferably ZSM-34, zeolitic materials described above can be used as zeolitic materials, adsorbent, catalyst, catalyst support or binder thereof. Especially preferred is the use as catalyst.

Moreover, embodiments of the present invention relate to a method of catalyzing a chemical reaction wherein the copper containing ZSM-34, OFF and/or ERI, preferably ZSM-34, zeolitic material according to the present invention is employed as catalytically active material.

Among others, said catalyst may be employed as catalyst for the selective reduction (SCR) of nitrogen oxides $NO_x$; for the oxidation of $NH_3$, in particular for the oxidation of $NH_3$ slip in diesel systems; for the decomposition of $N_2O$; for soot oxidation; for emission control in Advanced Emission Systems such as Homogeneous Charge Compression Ignition (HCCI) engines; as additive in fluid catalytic cracking (FCC) processes; as catalyst in organic conversion reactions; or as catalyst in "stationary source" processes. For applications in oxidation reactions, preferably an additional precious metal component is added to the copper chabazite (e.g. Pd, Pt).

Therefore, embodiments of the present invention also relate to a method for selectively reducing nitrogen oxides $NO_x$ by contacting a stream containing $NO_x$ with a catalyst containing the copper containing ZSM-34, OFF and/or ERI, preferably ZSM-34, zeolitic material according to the present invention under suitable reducing conditions; to a method of oxidizing $NH_3$, in particular of oxidizing $NH_3$ slip in diesel systems, by contacting a stream containing $NH_3$ with a catalyst containing the copper containing ZSM-34, OFF and/or ERI, preferably ZSM-34, zeolitic material according to the present invention under suitable oxidizing conditions; to a method of decomposing of $N_2O$ by contacting a stream containing $N_2O$ with a catalyst containing the copper containing ZSM-34, OFF and/or ERI, preferably ZSM-34, zeolitic material according to the present invention under suitable decomposition conditions; to a method of controlling emissions in Advanced Emission Systems such as Homogeneous Charge Compression Ignition (HCCI) engines by contacting an emission stream with a catalyst containing the copper containing ZSM-34, OFF and/or ERI, preferably ZSM-34, zeolitic material according to the present invention under suitable conditions; to a fluid catalytic cracking FCC process wherein the copper containing ZSM-34, OFF and/or ERI, preferably ZSM-34, zeolitic material according to the present invention is employed as additive; to a method of converting an organic compound by contacting said compound with a catalyst containing the copper containing ZSM-34, OFF and/or ERI, preferably ZSM-34, zeolitic material according to the present invention under suitable conversion conditions; to a "stationary source" process wherein a catalyst is employed containing the copper containing ZSM-34, OFF and/or ERI, preferably ZSM-34, zeolitic material according to the present invention.

In particular, the selective reduction of nitrogen oxides wherein the ZSM-34, OFF and/or ERI, preferably ZSM-34, zeolitic material according to the present invention is employed as catalytically active material is carried out in the presence of ammonia or urea. While ammonia is the reducing agent of choice for stationary power plants, urea is the reducing agent of choice for mobile SCR systems. Typically, the SCR system is integrated in the exhaust gas treatment system of a vehicle and, also typically, contains the following main components: SCR catalyst containing the ZSM-34, OFF and/or ERI, preferably ZSM-34, zeolitic material according to the present invention; a urea storage tank; a urea pump; a urea dosing system; a urea injector/nozzle; and a respective control unit.

Therefore, embodiments of the present invention also relate to a method for selectively reducing nitrogen oxides $NO_x$, wherein a gaseous stream containing nitrogen oxides $NO_x$, for example exhaust gas formed in an industrial process or operation, preferably also containing ammonia and/or urea, is contacted with the ZSM-34, OFF and/or ERI, preferably ZSM-34, zeolitic material according to the present invention.

The term nitrogen oxides, $NO_x$, as used in the context of the present invention designates the oxides of nitrogen, especially dinitrogen oxide ($N_2O$), nitrogen monoxide (NO), dinitrogen trioxide ($N_2O_3$), nitrogen dioxide ($NO_2$), dinitrogen tetroxide ($N_2O_4$), dinitrogen pentoxide ($N_2O_5$), nitrogen peroxide ($NO_3$).

The nitrogen oxides which are reduced using a catalyst containing the ZSM-34, OFF and/or ERI, preferably ZSM-34, zeolitic material according to the present invention or the ZSM-34, OFF and/or ERI, preferably ZSM-34, zeolitic material obtainable or obtained according to the present invention may be obtained by any process, e.g. as a waste gas stream. Among others, waste gas streams as obtained in processes for producing adipic acid, nitric acid, hydroxylamine derivatives, caprolactame, glyoxal, methyl-glyoxal, glyoxylic acid or in processes for burning nitrogeneous materials may be mentioned.

Especially preferred is the use of a catalyst containing the ZSM-34, OFF and/or ERI, preferably ZSM-34, zeolitic material according to the present invention or the ZSM-34, OFF and/or ERI, preferably ZSM-34, zeolitic material obtainable or obtained according to the present invention for removal of nitrogen oxides $NO_x$ from exhaust gases of internal combustion engines, in particular diesel engines, which operate at combustion conditions with air in excess of that required for stoichiometric combustion, i.e., lean.

Therefore, embodiments of the present invention also relate to a method for removing nitrogen oxides $NO_x$ from exhaust gases of internal combustion engines, in particular diesel engines, which operate at combustion conditions with air in excess of that required for stoichiometric combustion, i.e., at lean conditions, wherein a catalyst containing the ZSM-34, OFF and/or ERI, preferably ZSM-34, zeolitic material according to the present invention or the ZSM-34, OFF and/or ERI, preferably ZSM-34, zeolitic material obtainable or obtained according to the present invention is employed as catalytically active material. The selective reduction of NOx implies that $N_2$ should be the main product wherein side products such as $N_2O$ are minimized.

Embodiments of the present invention relate to an exhaust gas treatment system comprising an exhaust gas stream optionally containing a reductant like ammonia, urea and/or hydrocarbon, preferably ammonia or urea, and a catalyst containing a copper containing ZSM-34, OFF and/or ERI, preferably ZSM-34, zeolitic material, disposed on a substrate, a soot filter and a diesel oxidation catalyst.

The catalyzed or non catalyzed soot filter may be upstream or downstream of said catalyst. The diesel oxidation catalyst is preferably upstream of said catalyst. Preferably said diesel oxidation catalyst and said catalyzed soot filter are upstream from said catalyst.

Preferably, the exhaust is conveyed from the diesel engine to a position downstream in the exhaust system, preferably containing NOx, where a reductant is added and the exhaust stream with the added reductant is conveyed to said catalyst.

For example, a soot filter, a diesel oxidation catalyst and a reductant are described in WO 2008/106519 which is incorporated by reference.

The following examples shall further illustrate the process and the materials of the present invention. Unless otherwise indicated, all numbers expressing quantities of ingredients, reaction conditions, and so forth used in the specification and claims are understood as being modified in all instances by the term "about".

Examples

1. Commercial Sample of ZSM-34

A commercial sample of ZSM-34 was evaluated. The material has a $SiO_2:Al_2O_3$ of about 13, a $K_2O$ level ranging from 2.2 to 2.4 wt % and a $Na_2O$ loading of 0.1 wt %. All values are expressed on a calcined basis. The powder had an agglomerate size of 1.5 μm ($d_{10}$), 6.85 μm ($d_{50}$), 16.73 μm ($d_{90}$) and a primary crystallite size of 1.5 to 7 μm ($d_{50}$). The primary crystals were hexagonal in shape.

2. Ammonium Exchange (Comparative)

Table 1 indicates the level of alkali metal contents reached after multiple ammonium exchange steps. It can be seen that after one ammonium exchange a level of 1.27 wt % $K_2O$ has already been reached. Additional ammonium exchange steps result in $K_2O$ loadings of about 1 wt %.

The ammonium exchange step was typically carried out by dissolving 200 g of ammonium nitrate in 1000 g of deionized water. The solution was stirred at 250 rpm and this stirring was maintained throughout the ion-exchange. This was then heated to 80° C. before the addition of 100 g of zeolite. The temperature was returned to 80° C. and the ion-exchange was carried out for 24 hours. The solution was cooled then filtered to separate the solid. The material was washed with deionized water until a conductivity of less than about 200 μScm$^{-1}$ was achieved. The material was then dried at 120° C.

TABLE 1

Ammonium exchange and compositional details.

| Alkali metal content | Process | $K_2O$ (wt %) | $Na_2O$ (wt %) | $SiO_2:Al_2O_3$ |
|---|---|---|---|---|
| High | Sample as received (calcined version) | 2.29 | 0.12 | 13.0 |
| Medium | NH4 exchange | 1.27 | ND | 12.6 |
| | 2 NH4 exchanges | 1.08 | ND | 12.5 |
| | 3 NH4 exchanges | 1.04 | ND | 12.5 |

ND = not detected.

3. Copper Exchange 3.1. Reagents and Suspension Preparation

The following starting materials were employed:
Copper Acetate Monohydrate
Deionized water
Commercial ZSM-34 from example 1

3.2. Ion-Exchange Conditions and Chemical Analysis

Table 2 lists the important synthesis parameters for the ion-exchange in the preparation of examples A to D and the molar yield of Cu from solution (i.e. Cu usage). A copper acetate solution was prepared by dissolving copper acetate monohydrate in the appropriate amount of deionized water in a jacketed glass reactor. The liquid:solid ratio was set at 20:1 meaning that 100 g of ZSM-34 was exchanged with 2 kg of deionized water and the required amount of copper acetate to reach the target concentration. For example A, 2.5 g of copper acetate was dissolved in 1000 ml of deionized water before the addition of 50 g of ZSM-34. The temperature of 60° C. was maintained for 1 hour. After 1 hour of ion-exchange the slurry was filtered hot over a Buechner funnel. The filtercake was then washed with deionized water until the conductivity of the washwater reached <200 μScm-1. The sample was washed with room temperature washwater. The resulting powder was then dried in an oven at 120° C. for 16 hours. Table 2 also summarizes the CuO, $K_2O$ and $Na_2O$ loading of all resulting products. All values are reported on a calcined basis.

TABLE 2

Copper acetate exchange details, chemical analysis and compositional factors for Cu/ZSM-34.

| | Example A | Example B | Example C | Example D |
|---|---|---|---|---|
| Cu concentration (M) | 0.0125 | 0.0250 | 0.0500 | 0.1000 |
| CuO (wt %) | 1.96 | 2.67 | 3.88 | 4.49 |
| K2O (wt %) | 2.421 | 2.30 | 2.44 | 2.16 |
| Na2O (wt %) | 0.030 | 0.030 | 0.032 | 0.03 |
| Cu:Al | 0.10 | 0.14 | 0.20 | 0.24 |
| (2Cu + M):Al | 0.43 | 0.48 | 0.63 | 0.69 |
| Cu:H | 0.18 | 0.27 | 0.55 | 0.77 |
| moles Cu per 100 g zeolite (moles) | 0.025 | 0.034 | 0.049 | 0.056 |
| Cu Yield (%) | 98 | 67 | 49 | 28 |

4. Preparation of Catalyst (Examples A to D)

The powder was first prepared as an extrudate before testing. A typical preparation would involve adding 18 g of water to 20 g of dried powder in a Stephan-Werke GmbH mixer (Model No.: 0ZDe042/4s) at a mixing rate of 80 revolutions per minute. This was mixed until homogenous which took about 10 minutes. Then 0.5 g of polyethyleneoxide (PEO) were added and mixed until homogeneous which took 2 minutes. 2.5 wt % PEO was added to mixture as a binder. Then 2 g of water were added slowly and the paste was mixed for about 5 minutes to homogenize. This paste was then pressed in a hand-made press with an extruding hole of 2 mm diameter and 10 cm length. The resulting extrudates were dried at 120° C. for 5 hours and calcined at 540° C. for 5 hours. The extrudate was then sized into pellets and sieved to separate a pellet size of 0.5 to 1 mm. This size fraction was used for testing in the reactor. The sieves used were obtained from the company Retsch (500 μm sieve (S/N 04025277) and a 1 mm sieve (S/N 04009529) both having a diameter of 200 mm and height of 25 mm. The resultant catalysts are referred to as the fresh state meaning that they have not been subjected to any hydrothermal aging.

5. Aging

The aging reactor was composed of a 1 mm thick steel tube (grade 1.4841 from Buhlmann Group) with diameters of 500 mm height and 18 mm internal diameter. A nickel mantle based furnace was used to heat the reactor to the target reaction temperature which was monitored by an internal thermocouple at the location of the sample. The steam was prepared by heating controlled amounts of water at 150° C. through a steel presteamer before mixing with the remaining gases in a static mixer. The gases together with the steam were then passed through a preheater to enable the target temperature.

The extrudates formed as described in section 4 were hydrothermally aged in a tube furnace in a gas flow containing 10% $H_2O$, 10% $O_2$, balance $N_2$ at a space velocity of 12,500 $h^{-1}$ for 12 hours at 750° C. or 12 hours at 800° C. Aging at 750° C. is cons hydrothermal aging. Aging at 800° C. is considered severe hydrothermal aging.

6. Catalytic Testing (Examples A to D)

The catalysts samples obtained from sections 4 and 5 (fresh, 750 and 800° C. aged states) were evaluated for selective catalytic reduction of $NO_x$ activity using the following reactor set up:

The reactor was composed of a 1 mm thick steel tube (grade 1.4541 from Buhlmann Group) with diameters of 500 mm height and 18 mm internal diameter. A copper mantle based furnace was used to heat the reactor to the target reaction temperature which was monitored by an internal thermocouple at the location of the sample.

5 ml of sample was loaded into the reactor and secured with a plug of silica wool at each end of the sample. The sample height was controlled by filling the empty reactor volume with an inert silica based material (Ceramtek AG—product #1.080001.01.00.00; 0.5 to 1 mm-45 g at the bottom and 108 g at the top of the sample).

An inlet gas mixture was formed containing 500 ppm NO, 500 ppm $NH_3$, 10% $O_2$, 5% steam and balance He. The steam was prepared by heating controlled amounts of water at 150° C. through a steel presteamer (grade 1.4541 from Buhlmann, dimensions were 6 mm internal diameter and 900 mm length) before mixing with the remaining gases in a static mixer. This gas mixture then passed through a preheater set at 250° C. and static mixer before entering the SCR reactor described in the previous paragraph.

The $DeNO_x$ activity was measured under steady state conditions by measuring the $NO_x$, $NH_3$ and $N_2O$ concentrations at the outlet using a FTIR spectrometer. Samples were tested at reaction temperatures of 200 and 450° C. Furthermore, they were tested at a volume-based gas hourly space velocity of 30000 and 80000 $h^{-1}$. NO conversion was then calculated as ((NO inlet concentration (ppm)−NO outlet concentration (ppm))/NO inlet concentration (ppm))*100. $N_2O$ make was also recorded as concentration in ppm.

Table 3 contains the DeNOx activity of the prepared catalysts, in their fresh and aged 750° C. states, at reaction temperatures of 200 and 450° C. at the aforementioned space velocities. It also indicates the Langmuir surface areas of the fresh and 750° C. aged catalysts. Furthermore, the surface area retention is calculated from the aged surface area as a percentage of the fresh surface area.

Table 4 contains the DeNOx activity of the prepared catalysts, in their fresh and aged 800° C. states, at reaction temperatures of 200 and 450° C. at the aforementioned space velocities. It also indicates the Langmuir surface areas of the fresh and 800° C. aged catalysts. Furthermore, the surface area retention is calculated from the aged surface area as a percentage of the fresh surface area. Table 4 indicates that tighter control of composition is required to provide suitable DeNOx activity and stability after higher temperature hydrothermal aging.

$N_2O$ make for all samples was below 15 ppm at 200° C. and below 45 ppm at 450° C.

TABLE 3

Catalytic and surface area data for catalysts in fresh and 750° C. aged states.

| | | Example A | Example B | Example C | Example D |
|---|---|---|---|---|---|
| Space Velocity = 80000 h-1 | Fresh NO Conversion at 200° C. (%) | 58 | 68 | 73 | 83 |
| | Fresh NO Conversion at 450° C. (%) | 87 | 80 | 85 | 87 |
| | 750° C. Aged NO Conversion at 200° C. (%) | 50 | 70 | 74 | 69 |
| | 750° C. Aged NO Conversion at 450° C. % | 76 | 81 | 81 | 81 |
| Space Velocity = 30000 h-1 | Fresh NO Conversion at 200° C. (%) | 84 | 80 | 90 | 86 |
| | Fresh NO Conversion at 450° C. %) | 95 | 94 | 96 | 96 |
| | 750° C. Aged NO Conversion at 200° C. (%) | 77 | 82 | 80 | 85 |
| | 750° C. Aged NO Conversion at 450° C. % | 81 | 83 | 88 | 85 |
| Fresh Langmuir ($m^2$/g) | | 670.2 | 663.2 | 648.6 | 636.8 |
| 750° C. Aged Langmuir ($m^2$/g) | | 566.4 | 559 | 541 | 467.9 |
| 750° C. Aged Langmuir retention (%) | | 84.5 | 84.3 | 83.4 | 73.5 |

TABLE 4

Catalytic and surface area data for catalysts in fresh and 800° C. aged states.

| | | Example A | Example B | Example C | Example D |
|---|---|---|---|---|---|
| Space Velocity = 80000 h-1 | 800° C. Aged NO Conversion at 200° C. (%) | 46 | 67 | 24 | 4 |
| | 800° C. Aged NO Conversion at 450° C. (%) | 69 | 87 | 46 | 35 |
| Space Velocity = 30000 h-1 | 800° C. Aged NO Conversion at 200° C. (%) | 70 | 87 | 48 | 4 |
| | 800° C. Aged NO Conversion at 450° C. (%) | 81 | 89 | 63 | 61 |
| Fresh Langmuir ($m^2$/g) | | 670.2 | 663.2 | 648.6 | 636.8 |
| 800° C. Aged Langmuir ($m^2$/g) | | 503.9 | 507.2 | 125 | 22 |
| 800° C. Aged Langmuir retention (%) | | 75.2 | 76.5 | 19.3 | 3.5 |

6. Comparative Examples

Comparative examples with low alkali metal content were prepared by a series of ammonium exchanges with an intermediate calcination. The copper exchange process was similar to that described in section 2.2 with specific details outlined in Table 5.

TABLE 5

Copper acetate exchange conditions, chemical analysis and compositional factors for Cu/ZSM-34.

| | Comparative Example E | Comparative Example F |
|---|---|---|
| Cu concentration (M) | 0.0500 | 0.1000 |
| CuO (wt %) | 3.48 | 4.12 |
| K2O (wt %) | 0.10 | 0.07 |
| Na2O (wt %) | ND | ND |
| Cu:Al | 0.20 | 0.24 |
| (2Cu + M):Al | 0.42 | 0.49 |
| Cu:H | 0.35 | 0.47 |

TABLE 5-continued

Copper acetate exchange conditions, chemical analysis and compositional factors for Cu/ZSM-34.

| | Comparative Example E | Comparative Example F |
|---|---|---|
| moles Cu per 100 g zeolite (moles) | 0.044 | 0.052 |
| Cu Yield (%) | 44 | 26 |

The preparation of the fresh catalyst and SCR performance were the same as that described in sections 3 and 5. The volume-based space velocity is 80000 $h^{-1}$. By comparing examples C and D in Table 3 to comparative examples E and F in Table 6, it can be seen that the fresh performance is better in the materials with high alkali metal content even though the Cu:Al ratios are the same. Furthermore examples A and B in Table 3 indicate similar performance at much reduced Cu loadings when compared to comparative example F in Table 6.

TABLE 6

Catalytic data for fresh comparative examples.

| | Comparative Example E | Comparative Example F |
|---|---|---|
| Fresh NO Conversion at 200° C. (%) | 48 | 64 |
| Fresh NO Conversion at 450° C. (%) | 81 | 93 |

What is claimed is:
1. A copper containing ZSM-34, OFF and/or ERI zeolitic material having a silica to alumina mole ratio ranging from 4 to 50 and a copper content, reported as CuO, ranging from 1 to 10 wt.-%, based on the total weight of the calcined zeolitic material, and having an alkali metal content, reported as metal oxide, ranging from 1.5 to 12 wt.-%.

2. The copper containing ZSM-34, OFF and/or ERI zeolitic material of claim 1, wherein the alkali metal content, reported as metal oxide, ranges from 1.5 to 5 wt.-%.

3. The copper containing ZSM-34, OFF and/or ERI zeolitic material of claim 1, wherein the copper content, reported as CuO, ranges from 1 to 5 wt.-%, based on the total weight of the calcined zeolitic material when fresh or when aged at 750° C.

4. The copper containing ZSM-34, OFF and/or ERI zeolitic material of claim 1, wherein the copper content, reported as CuO, ranges from 1 to 3.5 wt.-%, based on the total weight of the calcined zeolitic material, when aged at 800° C.

5. The copper containing ZSM-34, OFF and/or ERI zeolitic material of claim 1, wherein the silica to alumina mole ratio ranges from 8 to 15.

6. The copper containing ZSM-34, OFF and/or ERI zeolitic material of claim 1,
wherein the copper containing ZSM-34, OFF and/or ERI zeolitic material has a silica to alumina mole ratio from 10 to 15 and wherein when the copper containing ZSM-34, OFF and/or ERI zeolitic material being fresh or aged at 750° C. in 10% steam for 24 hours, the atomic ratio of copper to aluminum ranges from 0.04 to 0.5.

7. The copper containing ZSM-34, OFF and/or ERI zeolitic material of claim 1,
wherein the copper containing ZSM-34, OFF and/or ERI zeolitic material has a silica to alumina mole ratio from 10 to 15 and wherein when the copper containing ZSM-34, OFF and/or ERI zeolitic material being aged at 800° C. in 10% steam for 12 hours, the atomic ratio of copper to aluminum ranges from 0.04 to 0.28.

8. The copper containing ZSM-34, OFF and/or ERI zeolitic material of claim 1,
wherein the copper containing ZSM-34, OFF and/or ERI zeolitic material has a silica to alumina mole ratio from 4 to 10, and wherein, when the copper containing ZSM-34, OFF and/or ERI zeolitic material is fresh or aged at 750° C. in 10% steam for 24 hours, the atomic ratio of copper to aluminum ranges from 0.02 to 0.5.

9. The copper containing ZSM-34, OFF and/or ERI zeolitic material of claim 1,
wherein the copper containing ZSM-34, OFF and/or ERI zeolitic material has a silica to alumina mole ratio from 4 to 10, and wherein, when the copper containing ZSM-34, OFF and/or ERI zeolitic material being aged at 800° C. in 10% steam for 12 hours, the atomic ratio of copper to aluminum ranges from 0.02 to 0.2.

10. The copper containing ZSM-34, OFF and/or ERI zeolitic material of claim 1, wherein the copper containing ZSM-34, OFF and/or ERI zeolitic material has a silica to alumina mole ratio from 4 to 15, and wherein an atomic ratio of the sum of two times Cu and alkali metal to aluminum, (2Cu+M)/Al, ranges from 0.21 to 1 when fresh aged at 750° C. in 10% steam for 24 hours, or when aged at 800° C. in 10% steam for 12 hours.

11. The copper containing ZSM-34, OFF and/or ERI zeolitic material of claim 1,
wherein the copper containing ZSM-34, OFF and/or ERI zeolitic material has a silica to alumina mole ratio from 10 to 15, and wherein an atomic ratio of copper to proton ranges from 0.05 to 1000 when fresh, aged at 750° C. in 10% steam for 24 hours, or when aged at 800° C. in 10% steam for 12 hours.

12. The copper containing ZSM-34, OFF and/or ERI zeolitic material of claim 1,
wherein the copper containing ZSM-34, OFF and/or ERI zeolitic material has a silica to alumina mole ratio from 4 to 10, and wherein an atomic ratio of copper to proton ranges from 0.02 to 500 when fresh, aged at 750° C. in 10% steam for 24 hours, or when aged at 800° C. in 10% steam for 12 hours.

13. The copper containing ZSM-34, OFF and/or ERI zeolitic material of claim 1,
wherein, measured at a gas hourly volume based space velocity of 80000 $h^{-1}$, the copper containing ZSM-34, OFF and/or ERI zeolitic material, when fresh, exhibits a NO conversion at 200° C. of at least 50% and at 450° C. of at least 70%;
the copper containing ZSM-34, OFF and/or ERI zeolitic material, when aged at 750° C., exhibits NO conversion at 200° C. of at least 50% and at 450° C. of at least 65%; and
the copper containing ZSM-34, OFF and/or ERI zeolitic material, when aged at 800° C., exhibits NO conversion at 200° C. of at least 50% and at 450° C. of at least 70%.

14. The copper containing ZSM-34, OFF and/or ERI zeolitic material of claim 1,
wherein the Langmuir surface area, determined according to DIN ISO 9277, of the copper containing ZSM-34, OFF and/or ERI zeolitic material is in the range from 400 to 900 $m^2/g$ and the copper containing ZSM-34, OFF and/or ERI zeolitic material, after exposure to a temperature of 750° C. in the presence of up to 10 volume percent water vapor for a time ranging from 1 to 48 hours, retains at least 70% of its fresh surface area.

15. The copper containing ZSM-34, OFF and/or ERI zeolitic material of claim 1, wherein the zeolitic material is ZSM-34.

16. A catalyst comprising the copper containing ZSM-34, OFF and/or ERI zeolitic material of claim 1 disposed on a substrate.

17. A process for the preparation of a zeolitic material, the process comprising synthesizing the copper containing ZSM-34, OFF and/or ERI zeolitic material of claim 1, wherein, during the synthesis, no ammonium exchange is conducted.

18. A method for promoting a reaction, the method comprising contacting a gas stream with a catalyst comprising the copper containing ZSM-34, OFF and/or ERI zeolitic material of claim 1, wherein the reaction is selected from one or more of selective reduction (SCR) of nitrogen oxides $NO_x$; oxidation of $NH_3$; decomposition of $N_2O$; soot oxidation; emission control in Advanced Emission Systems; fluid catalytic cracking (FCC); organic conversion; or stationary source processes.

19. An exhaust gas treatment system comprising an exhaust gas stream containing ammonia, a catalyst comprising the copper containing ZSM-34, OFF and/or ERI zeolitic material of claim 1, a soot filter, and a diesel oxidation catalyst.

20. A method of selectively reducing nitrogen oxides $NO_x$, the method comprising contacting a gaseous stream containing nitrogen oxides $NO_x$ with the copper containing ZSM-34, OFF and/or ERI zeolitic material of claim 1.

* * * * *